Feb. 10, 1942.                H. F. SMITH                 2,272,925
                        REFRIGERATING APPARATUS
                        Filed June 26, 1936           3 Sheets-Sheet 2

INVENTOR.
Harry F. Smith
BY Spencer, Hardman & Fehr
ATTORNEY.

Feb. 10, 1942.   H. F. SMITH   2,272,925
REFRIGERATING APPARATUS
Filed June 26, 1936    3 Sheets-Sheet 3
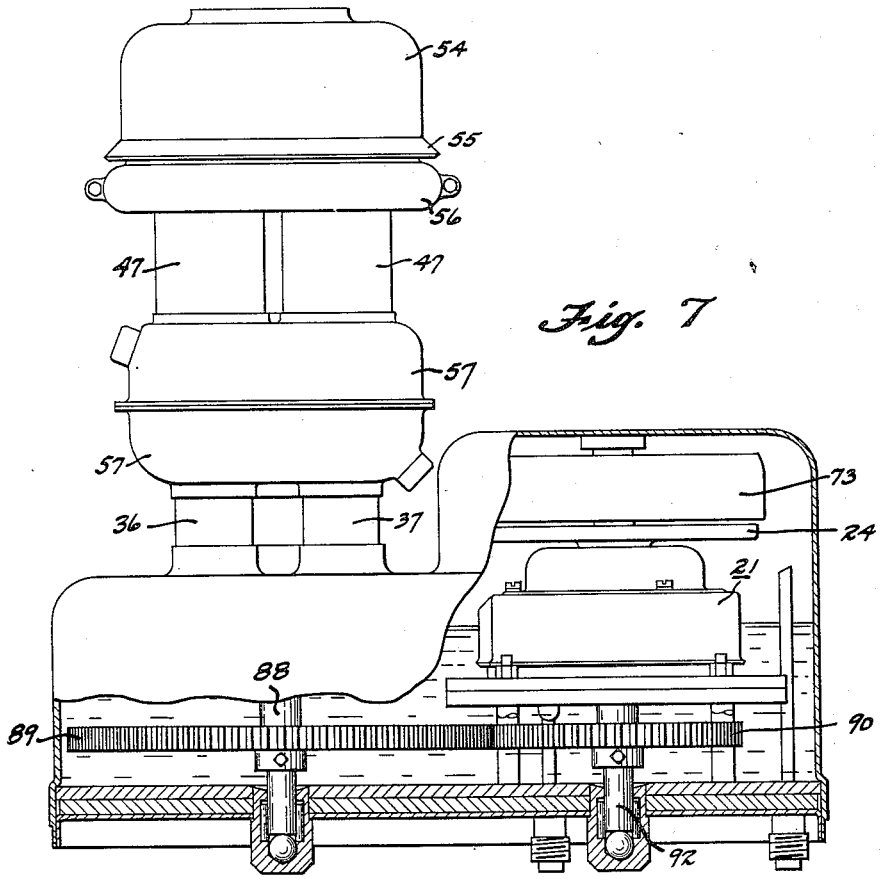
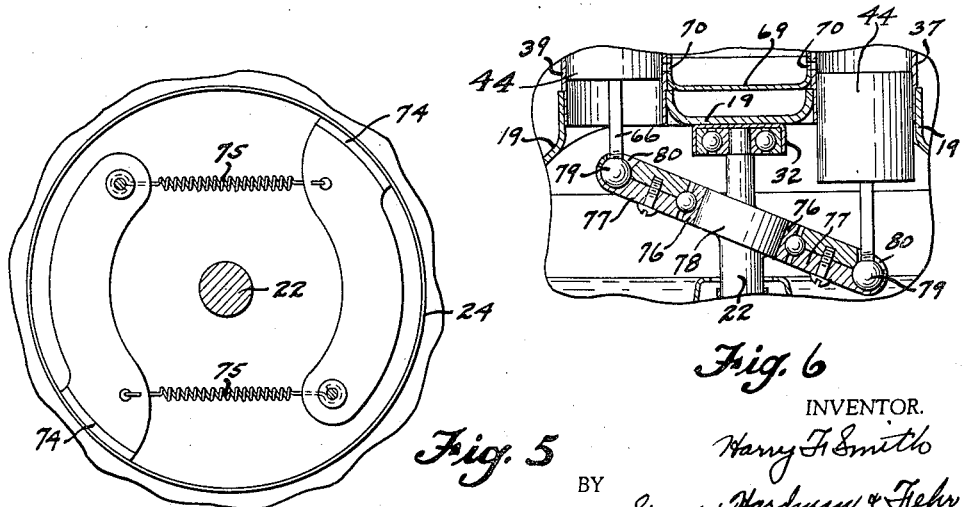
INVENTOR.
Harry F. Smith
BY Spencer, Hardman & Kehr
ATTORNEY.

Patented Feb. 10, 1942

2,272,925

UNITED STATES PATENT OFFICE 2,272,925

REFRIGERATING APPARATUS

Harry F. Smith, Dayton, Ohio, assignor to General Motors Corporation, Dayton, Ohio, a corporation of Delaware Application June 26, 1936, Serial No. 87,474

6 Claims. (Cl. 62—115)

This invention relates to refrigerating apparatus and more particularly to the combination of a heat engine with a refrigerating system.

It is an object of this invention to provide an efficient refrigerating system operated by heat in which the prime mover for the compressor and the compressor constitute a fully enclosed unit requiring no stuffing boxes or running seals.

It is a further object to provide a heat engine and a compressor which have a common crank case.

It is a further object to provide a combination of a heat engine and compressor in which the output of the engine automatically increases with the load on the compressor.

It is a further object of this invention to utilize liquid refrigerant for cooling a portion of the heat engine.

Another object of the invention is to provide an improved four-cylinder Stirling cycle heat engine in which the cylinders are symmetrically arranged and in which the displacer for one cylinder is connected to a piston of an adjacent cylinder and in which the cylinders are phased ninety degrees apart.

Still another object of this invention is to provide new and improved lubricating means for the movable parts of the engine.

Another object of the invention is to utilize a Stirling cycle heat engine which is completely enclosed within the circuit of a refrigerating machine and operating said engine on refrigerant vapor as the working fluid.

Still another object of this invention is to operate a compressor by means of a Stirling cycle heat engine located within the high side of the compressor.

Further objects and advantages of the present invention will be apparent from the following description, reference being had to the accompanying drawings, wherein a preferred form of the present invention is clearly shown.

In the drawings:

Fig. 5 is a cross-sectional view on line 5—5 showing the clutch mechanism;

Fig. 6 is a sectional view of the wobble plate drive; and

Fig. 7 is a view partly in section and partly in elevation of a modified heat engine and compressor unit.

Figure 1:
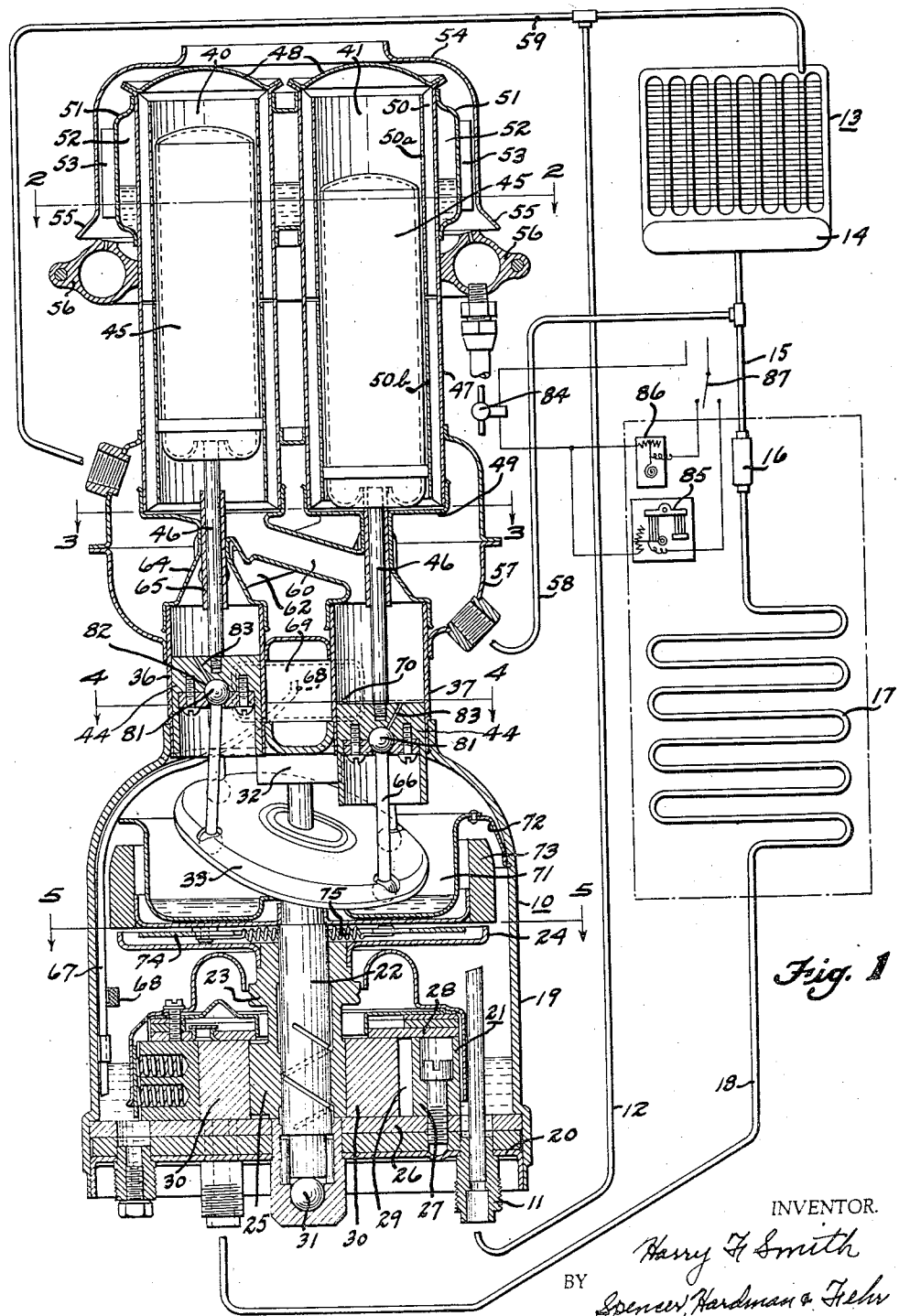
Fig. 1 shows a sectional elevational view of a combined heat engine and compressor and also includes a diagrammatic showing of the refrigerating system and the controls for the engine.
Figure 2:
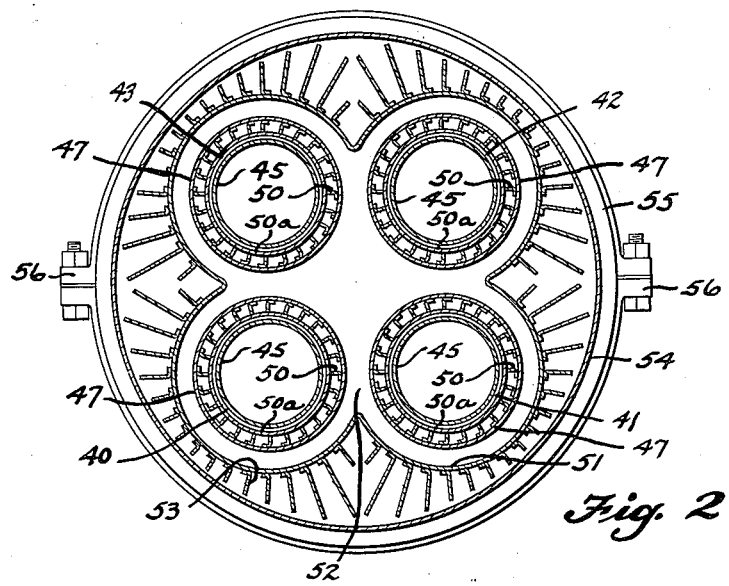
Fig. 2 is a cross-sectional view taken on line 2—2 of Fig. 1.
Figure 3:
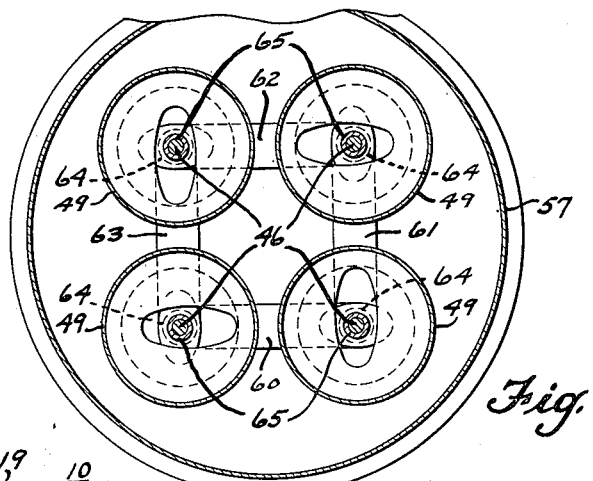
Fig. 3 is a cross-sectional view taken on the line 3—3 of Fig. 1.

In the form of the invention illustrated in the drawings, a compressor generally designated as 10 delivers compressed refrigerant to an outlet connection 11, whence it is delivered by conduit 12 to a condenser 13. The refrigerant liquefied in the condenser 13 is collected in a receiver 14 and delivered by conduit 15 to an expansion valve or other liquid refrigerant control device 16, whence the refrigerant expands into the evaporator 17. The expanded refrigerant is withdrawn from the evaporator 17 through a conduit 18 to the inlet of the compressor 10. The compressor unit 10 comprises a hermetically sealed housing 19 having a base 20 and within which is located a rotary compressor 21. A rotary shaft 22 is mounted within the housing 19 centrally thereof to form a central support for additional rotating parts of the motor-compressor unit. The latter comprise a sleeve 23 journaled on the shaft 22 and carrying the clutch plate 24 driven by mechanism to be described hereinafter and an eccentric journal 25 at the lower end of the sleeve 23. The stationary body of the compressor 21 comprises a base 26 rigidly secured to the base 20 as by welding, a cylindrical body member 27 and a valve plate 28, both of which are suitably secured to the base 26. The members 26, 27 and 28 form a cylindrical chamber 29 within which an impeller 30 is given a planetating movement by the rotation of the sleeve 23 carrying the eccentric 25. A divider block (not shown) is mounted in a radial slot in the cylindical body member 21 to divide the chamber 29 into suction and discharge chambers. The conduit 18 communicates with the suction chamber on one side of the divider block while on the opposite side of the divider block, a discharge passage (not shown) communicates with the discharge chamber. The rotary shaft 22 rests on an end thrust bearing 31. The upper end of shaft 22 is rotatably supported in a grease packed bearing member 32. Adjacent the upper end of the shaft 22 is secured a wobble plate drive mechanism generally designated as 33, the construction of which will be described hereinafter.

Figure 4:
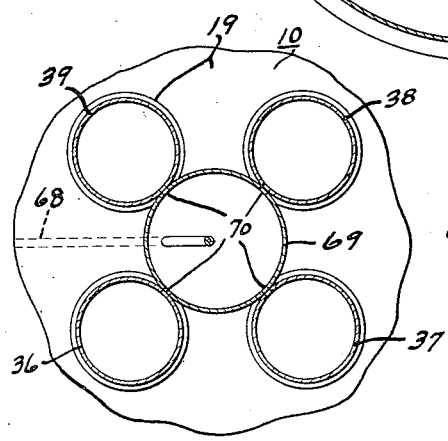
Fig. 4 is a cross-sectional view taken on line 4—4 of Fig. 1.

Secured to the upper portion of the compressor unit 10 is a Stirling cycle heat engine generally designated by the reference numeral 35 which operates on refrigerant vapor as the working fluid. The particular heat engine shown in Fig. 1 is a four-cylinder unit in which the cylinders designated as 36, 37, 38 and 39 are symmetrically arranged as shown in Fig. 4. Heating chambers 40, 41, 42 and 43 are mounted in axial alignment with cylinders 36, 37, 38 and 39 respectively. Within each cylinder is slidably mounted a piston 44 and within each heating chamber is mounted a displacer 45 which is rigidly secured to a piston 44 which is in alignment therewith by means of rod 46. Each heating chamber comprises an outer shell 47 to which is secured, as by welding, an end plate 48 and a lower closure member 49 through which the rod 46 reciprocates. Within each shell 47 and concentric therewith but spaced therefrom are provided two cylindrical members 50a and 50b which are held in place by radially extending fins 50, the purpose of which will be hereinafter explained. Each displacer 45 comprises a hollow cylindrical member 20 which is slightly smaller in diameter than the members 50a and 50b so as to permit free movement of the displacer from one end of the chamber to the other. As a displacer reciprocates, gas within the chamber is displaced from one end of the chamber to the other via the passages between the outer shell 47 and member 50a and 50b. Jacket member 51 surrounds the upper ends of the chambers and forms therewith pocket 52 in which mercury or some other liquid having a high boiling point is placed. Jacket 51 is provided with fins 53. Spaced slightly from the outer edges of the fins 53 is mounted a shell member 54, the lower edge of which is flanged as at 55. A gas burner 56 is placed slightly below the flange 55 in such a manner that heat supplied by the gas burner passes up between the jacket 51 and shell 54 and is absorbed by the mercury by virtue of the fins 53. The mercury and fins 50 assist in transferring the heat to the gas in the upper ends of the heating chambers 40, 41, 42 and 43. A jacket 57 surrounds the lower portions of chambers 40, 41, 42 and 43 and the upper portion of cylinders 36, 37, 38 and 39 and is adapted to hold liquid refrigerant which serves to cool the gases within the cylinders and in the lower portions of the chambers 40, 41, 42 and 43. Liquid refrigerant from the receiver 14 is supplied to the jacket 57 through conduit 58 and the refrigerant evaporated within the jacket 57 returns to the condenser 13 by way of conduit 59. Conduit 60 connects chamber 40 with cylinder 37; conduit 61 connects chamber 41 with cylinder 38; conduit 62 connects chamber 42 with the cylinder 39 and conduit 63 connects chamber 43 with cylinder 36. Inasmuch as this engine operates on the Stirling cycle, the same fluid is used over and over again in each cylinder. Between each cylinder and the chamber in alignment therewith is a restricted portion such as 64 within which is mounted a bushing 65 which serves as a guide for rod 46 and also serves to seal each chamber from the cylinder in alignment therewith. The lower end of each piston has operatively secured thereto a rod 66 which cooperates with the wobble plate generally designated at 33. As will be apparent from a study of Fig. 1, for example, the cylinders are symmetrically arranged and by virtue of the wobble plate construction, the cycle of operation of each cylinder is displaced 90 degrees from each adjacent cylinder.

In rotary compressor units of this general type, the usual practice is to permit a supply of oil to stand in the bottom of the compressor, which supply of oil effectively lubricates the moving parts of the compressor. In order to supply lubricant to the moving parts of the heat engine, applicant provides a lubricant supplying line 67 which has its lower end terminating below the normal lubricant level within the compressor unit and has its upper end 68 terminating within a lubricant reservoir 69 which is located centrally of the cylinders as best shown in Fig. 4. As shown in said figure, outlets 70 lead from the reservoir into each of the cylinders. As shown in Fig. 1, these outlets enter the cylinders slightly above the lowermost position of the pistons so that lubricant within the reservoir may discharge into each cylinder for each stroke of the cylinder. This particular arrangement has numerous desirable features.

In the first place, lubricant fed into the cylinders in this manner is splashed up into contact with the rods 46 so as to furnish lubrication between the rods and the bushings 65 and also serves to lubricate the piston in its movement up and down within the cylinder. In the second place, the line 67 is provided with a screened opening 68 which permits compressed refrigerant vapor to flow into the upper ends of the cylinder walls in the event that the pressure above the pistons becomes less than the pressure within the compressor unit. The screened opening is small enough and close enough to the oil level within the compressor so that refrigerant flowing in line 67 will carry with it a certain amount of oil. Oil will also tend to creep up into line 67 merely by capillary action.

By virtue of this arrangement, when the load on the compressor is increased, the pressure within the housing 19 will be correspondingly increased and this being the case, refrigerant will pass through the screened opening 68 into the oil line and will equalize with the pressure within the cylinders when the pistons are in their lower-most position. Consequently the pressures within the engine will correspond with the pressure on the high side of the compressor and with greater pressures therein, the power developed will be correspondingly greater. Lubricant which leaks between the piston and the cylinder wall will collect in an oil pan 71 which is secured to the housing 19 by means of supporting bracket 72 whereby the outer extremities of the wobble plate will splash into the lubricant collected within the oil pan 71. As will be apparent from a study of Fig. 1, surplus oil from the pan 71 will splash out over the edges and will return to the bottom of the compressor compartment. A fly wheel 73 is rigidly secured to the shaft 22 and carries with it pivotally mounted clutch shoes 74 which swing out into engagement with the clutch plate 24 when the fly wheel has attained a predetermined speed. Spring 75 resists the outward movement of the clutch shoes 74. The strength of the springs may be designed to cause engagement of the clutch at any desired speed.

The wobble plate drive mechanism shown in Fig. 6 is of the usual type and comprises an inner ball race 76 and corresponding outer ball race 77 which are supported on the enlarged portion 78 of the rotary shaft 22. Upon a downward movement of the rod 66 shown on the right side of Fig. 6, rotation will be imparted to the rotary shaft 22 and by virtue of the four rods 66 successively pushing downwardly on the wobble plate, rotation of shaft 22 will be sustained. Each rod 66 is provided with a ball 79 operating in a socket 80 in the wobble plate and a ball 81 operating in a socket 82 in the piston. Lubricant is fed to the ball 81 through aperture 83, whereas lubricant is supplied to the ball 79 by virtue of the wobble plate splashing around in the oil contained within the oil pan 71.

The amount of fuel supplied to the burner 56 is regulated by valve 84 which is electrically operated by either the humidity responsive means 85 or the temperature responsive means 86 depending on the position of the manually operated switch 87. When the temperature responsive means is in operation, for example, the higher the temperature becomes within the cooling chamber, the wider the valve 84 will be opened.

In Fig. 7 there is shown a modification of the arrangement shown in Fig. 1 in which the compressor unit is located beside the heat engine and in which the heat engine is identical in construction to the heat engine shown in Fig. 1 and in which the compressor mechanism and the clutch mechanism are also identical to the corresponding elements in Fig. 1. On the shaft 88 which corresponds to the upper portion of shaft 22 in Fig. 1, is mounted a gear 89 which cooperates with gear 90 mounted on the shaft 92 which corresponds to the lower portion of shaft 22. In this modification, a wobble plate drive identical in construction to the wobble plate drive shown in Fig. 1, imparts rotation to shaft 88 and gear 89, which in turn imparts rotation to gear 90 and shaft 92. With such an arrangement, the sizes of the gears 89 and 90 may be selected so as to provide any desirable speed ratio. Obviously, a speed reduction mechanism could be provided in the structure shown in Fig. 1 if it should be found desirable.

The operation of the device shown in Fig. 1 is as follows. Heat is applied to the upper ends of the chambers 40, 41, 42 and 43 by the gas burner 56 and the heat so applied is utilized to heat the gas in the upper portion of said chambers. Considering that the mechanism is at a standstill and starts up from the position shown in Fig. 1 when sufficient heat has been applied thereto to heat the gas in the upper part of chamber 41, said gas will tend to expand and the only chance for expansion to take place is by displacing the piston within the cylinder 38. Displacement of cylinder 38 will cause the wobble plate to impart rotation to shaft 22 and upon rotation of the shaft 22, it will be apparent that the displacer in chamber 41 will have moved to a higher position and the gas in the upper portion of chamber 41 will be transferred to the lower portion of chamber 41 and cylinder 38. The gas thus confined within the cylinder 38 and the chamber 41 will be subjected to the cooling action of the refrigerant within cooling chamber 57 with the result that the pressure will materially decrease and very little energy will be required to move the piston in the cylinder 38 upwardly and thereby recompress the fluid confined to chamber 41 and the cylinder 38. The action thus explained which has taken place in the cylinder 38 and chamber 41 will next take place in cylinder 39 and chamber 42, then in cylinder 36 and chamber 43, and then in cylinder 37 and chamber 40, and this action will be repeated for each revolution of the compressor unit. It should be noted that each cylinder is connected by means of a duct such as 60 to a heating chamber in alignment with an adjacent cylinder whereby the proper phase relationship exists between the pistons and displacers. The hot gas passing from the upper portion of chamber 41, for example, into the lower portion of chamber 41 and cylinder 38 will deposit a portion of its heat on the finned structure between the outer shell 47 and the casing or shells 50a and 50b, but this heat will not be lost, since before the cycle is completed, the gas which has been cooled while in the cylinder 38 and the lower portion of chamber 41 will be displaced into the upper portion of chamber 41 and in being displaced will absorb the heat just deposited therein. The fins, therefore, serve as regenerators with the result that the thermal losses in an engine of this type are exceedingly small. The lower portion of the fins 50 will assist in cooling the gas which is in the lower portion of the chamber.

The disadvantages of all known prior heat engines operating on the Stirling cycle have largely been eliminated in applicant's arrangement. As will be apparent from a study of the device, no stuffing boxes or running seals are necessary. Any leakage which may take place between a piston and its cylinder wall will have no serious affect on the operation of the engine and in fact this leakage is made use of to pump lubricant from the compression unit into the cylinder units in a manner previously explained. The greater the leakage, the more oil will be supplied. For each stroke of a piston, the pressure within the compressor unit becomes equalized with the pressure within the cylinder immediately the piston uncovers the aperture 70. As a result of the pressures being equalized in the above manner, an increase in load on the compressor results in an increase in the pressure within the heat engine, and the greater the pressure within the engine, the more will be the power developed thereby. It is applicant's intention to utilize the same fluid within the heat engine as is used within the refrigerating system with the result that the fluid leaking past the piston will not be lost. Any inequality in the pressures within the four cylinder units will be adjusted almost immediately by virtue of the apertures 70, one of which leads from each cylinder to the common reservoir 69.

Inasmuch as the high side pressure in compressors of this general type approximates eight atmospheres, the low pressure within the heat engine will also approximate eight atmospheres. For each revolution of the compressor shown in Fig. 1, the gas within a single cylinder and its cooperating heating chamber is acted upon as follows. The temperature of the gas is increased while the gas is in the upper portion of the heating chamber. The increased temperature automatically increases the pressure of the gas. The increased pressure is utilized in driving the piston. After having displaced the piston, the gas is cooled with a resultant decrease in pressure. Thereafter, the fluid is compressed and displaced from the lower portion of the chamber into the upper portion whereby the temperature of the gas is again increased and a new cycle of operation started.

While the form of embodiment of the present invention as herein disclosed constitutes a preferred form, it is to be understood that other forms might be adopted, all coming within the scope of the claims which follow.

What is claimed is as follows:

1. In a refrigerating device, a compressor, a Stirling cycle heat engine for operating said compressor, said heat engine comprising a cylinder, a displacer piston operating within said cylinder, means for supplying heat to one end of said cylinder, and means for supplying liquid refrigerant in thermal exchange relationship with the other end of said cylinder.

2. In a refrigerating device, a compressor, a condenser and an evaporator connected in refrigerant flow relationship, a Stirling cycle heat engine for operating said compressor, and means whereby refrigerant condensed in said condenser is utilized in cooling a portion of said heat engine.

3. In a refrigerating system, a heat engine for supplying power for said system, said engine comprising a cylinder, a displacer piston operating within said cylinder, means for supplying heat to one portion of said cylinder, and means for supplying liquid refrigerant in thermal exchange relationship with another portion of said cylinder.

4. In a refrigerating device, a compressor, a condenser and an evaporator connected in refrigerant flow relationship, a heat engine, power transmitting means between said heat engine and said compressor, and means whereby refrigerant condensed in said condenser is utilized in cooling a portion of said heat engine.

5. In a refrigerating system, an evaporator, a condenser, a hermetically sealed casing, a compressor within said casing, Stirling cycle heat engine mechanism sealed within said casing and cooperating with a portion of said casing to form a Stirling cycle heat engine, power transmitting means between said engine and compressor also sealed within said casing, and refrigerant flow connections between said evaporator, condenser and compressor.

6. In a heat engine, a plurality of power units each containing a charge of expansible matter and each including mechanism driven by the expansion and contraction of said matter, a refrigerant compressor driven by said mechanism, and means whereby the charge of expansible matter in each of said power units varies as the head pressure of said compressor varies.

HARRY F. SMITH.